US012673654B2

(12) United States Patent
Baek et al.

(10) Patent No.: US 12,673,654 B2
(45) Date of Patent: *\*Jul. 7, 2026*

(54) ELECTROMECHANICAL BRAKE AND METHOD OF OPERATING THE SAME

(71) Applicant: HL MANDO CORPORATION, Gyeonggi-do (KR)

(72) Inventors: Seungtae Baek, Gyeonggi-do (KR); Joon-kyu Song, Gyeonggi-do (KR); Kyungho Jung, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 677 days.

This patent is subject to a terminal disclaimer.

(21) Appl. No.: 18/009,269

(22) PCT Filed: Jun. 7, 2021

(86) PCT No.: PCT/KR2021/007099

§ 371 (c)(1),
(2) Date: Dec. 8, 2022

(87) PCT Pub. No.: WO2021/251709

PCT Pub. Date: Dec. 16, 2021

(65) Prior Publication Data

US 2023/0256951 A1 Aug. 17, 2023

(30) Foreign Application Priority Data

Jun. 8, 2020 (KR) ........................ 10-2020-0068764

(51) Int. Cl.
*B60T 13/74* (2006.01)
*B60T 8/171* (2006.01)
*B60T 17/22* (2006.01)

(52) U.S. Cl.
CPC ............ *B60T 13/746* (2013.01); *B60T 8/171* (2013.01); *B60T 17/22* (2013.01)

(58) Field of Classification Search
CPC .... F16D 65/567; F16D 65/66; F16D 2125/40; F16D 2125/405; B60T 1/065; B60T 8/17; B60T 13/746; B60T 17/22
See application file for complete search history.

(56) References Cited

U.S. PATENT DOCUMENTS

| | | | |
|---|---|---|---|
| 5,219,047 A | 6/1993 | Fouilleux et al. | |
| 12,084,016 B2 * | 9/2024 | Baek ........................ | F16D 65/18 |

(Continued)

FOREIGN PATENT DOCUMENTS

| | | |
|---|---|---|
| DE | 10 2011 080 714 | 12/2012 |
| JP | 1-299328 | 12/1989 |

(Continued)

OTHER PUBLICATIONS

International Search Report for PCT/KR2021/007099 mailed on Oct. 6, 2021 and its English Machine Translation by the WIPO (now published as WO 2021/251709).

(Continued)

*Primary Examiner* — Nicholas J Lane
(74) *Attorney, Agent, or Firm* — WOMBLE BOND DICKINSON (US) LLP

(57) ABSTRACT

Disclosed is an electromechanical brake and a method of operating the same. In accordance with an aspect of the disclosure the electromechanical brake includes a piston configured to advance and retreat to press a brake pad; a power transmission unit configured to receive a driving force from an actuator to convert a rotational motion into a linear motion, and provide the converted driving force to the piston; and a position adjustment unit configured to adjust a relative position of the piston with respect to the power transmission unit; wherein the power transmission unit includes a spindle rotating by receiving the driving force from the actuator, and a nut connected to the spindle and moving forward or backward an inside of the piston by (Continued)

rotation of the spindle in a first direction or a second direction to advance and retreat the piston, wherein the position adjustment unit includes an adjusting screw provided on an outer side of the nut and rotating together with the nut, a first screw thread formed on an outer circumferential surface of the adjusting screw, a second screw thread formed on an inner circumferential surface of the piston and meshing with the first screw thread, and an adjuster provided between the spindle and the nut, the adjuster configured to rotate the nut and the adjusting screw in the first direction or the second direction by compressing or expanding to its original shape when an rotation amount of the spindle exceeds a predetermined rotation amount, to advance or retreat the relative position of the piston.

10 Claims, 7 Drawing Sheets

(56)                References Cited

U.S. PATENT DOCUMENTS

| 2016/0355169 | A1* | 12/2016 | Ohlig | B60T 13/741 |
| 2019/0331180 | A1* | 10/2019 | Chelaidite | F16H 25/24 |
| 2022/0024434 | A1* | 1/2022 | Baek | F16D 65/183 |
| 2022/0235839 | A1* | 7/2022 | Baek | B60T 13/741 |
| 2022/0242384 | A1* | 8/2022 | Baek | B60T 17/221 |
| 2022/0260125 | A1* | 8/2022 | Tarandek | F16D 65/567 |
| 2022/0324427 | A1* | 10/2022 | Puiu | B60T 1/065 |

| 2023/0062142 | A1* | 3/2023 | Song | F16D 65/183 |
| 2023/0258237 | A1* | 8/2023 | Park | B60T 13/741 188/71.1 |
| 2023/0271596 | A1* | 8/2023 | Jung | F16D 65/183 |
| 2023/0287949 | A1* | 9/2023 | Baek | B60T 13/746 |

FOREIGN PATENT DOCUMENTS

| JP | 8-312701 | 11/1996 |
| JP | 2739955 | 4/1998 |
| JP | 2001-343038 | 12/2001 |
| JP | 2008-115880 | 5/2008 |
| KR | 10-1511437 | 4/2015 |
| KR | 10-1536598 | 7/2015 |
| KR | 10-2018-0060733 | 6/2018 |

OTHER PUBLICATIONS

Written Opinion of the International Searching Authority for PCT/KR2021/007099 mailed on Oct. 6, 2021 and its English Machine Translation by the WIPO (now published as WO 2021/251709).
Office Action (1st) dated Feb. 24, 2025 for Korean Patent Application No. 10-2020-0068764 and its English translation provided by Applicant's foreign counsel.
Office Action (1st) dated Dec. 18, 2025 for Chinese Patent Application No. 202180041431.0 and its English translation provided by Applicant's foreign counsel/Google Translate.
Office Action (1st) dated Dec. 1, 2025 for German Patent Application No. 11 2021 002 707.7 and its English translation provided by Applicant's foreign counsel.

* cited by examiner

【FIG. 1】
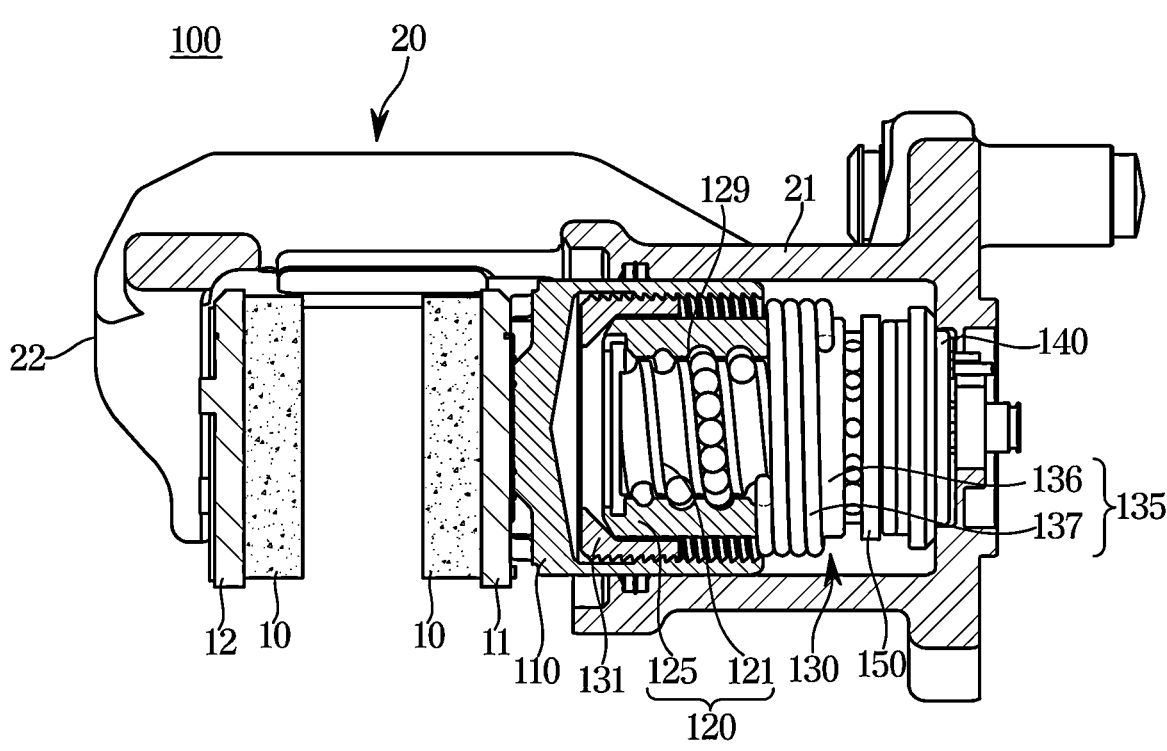

【FIG. 2】
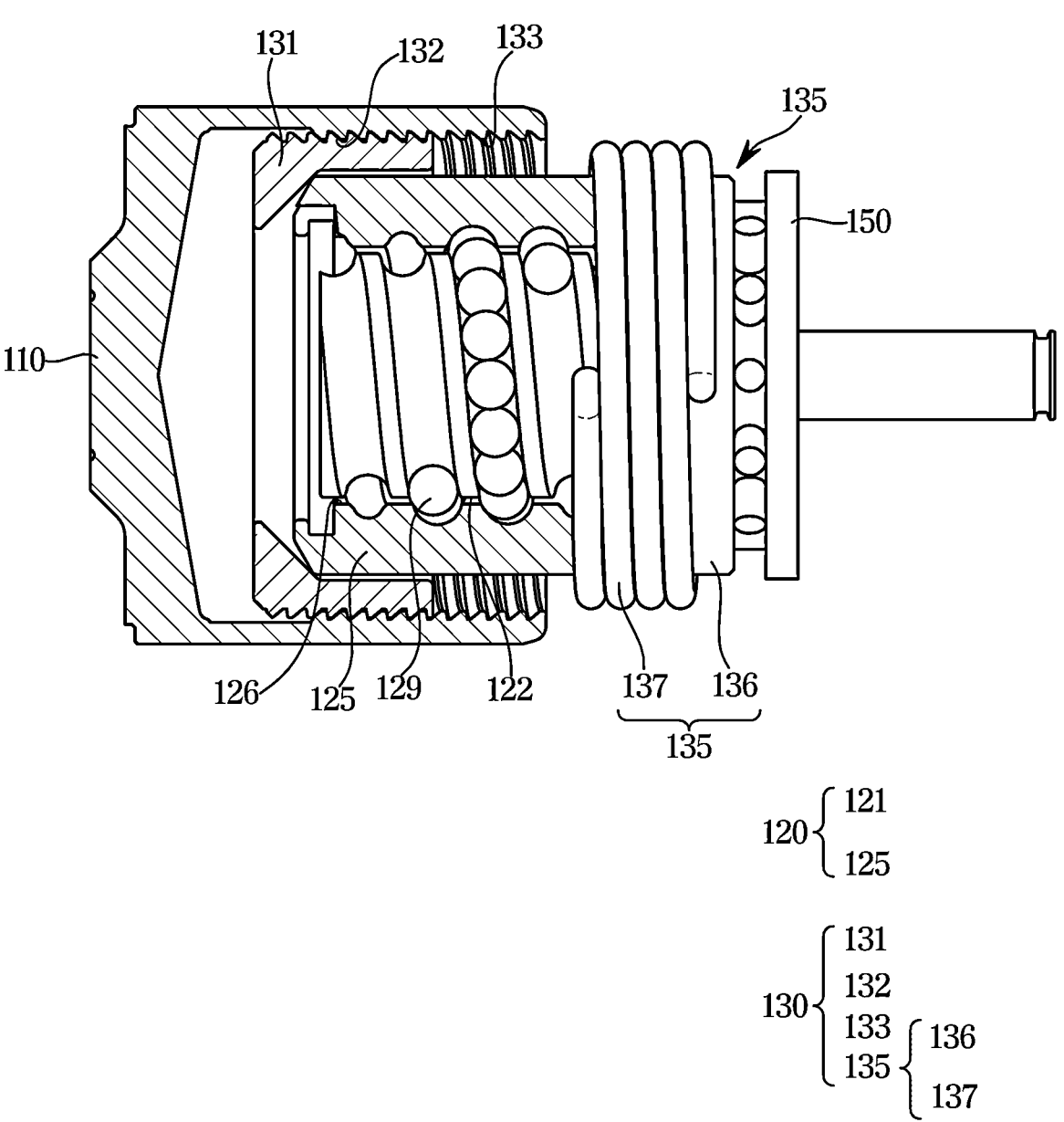

[ FIG. 3 ]
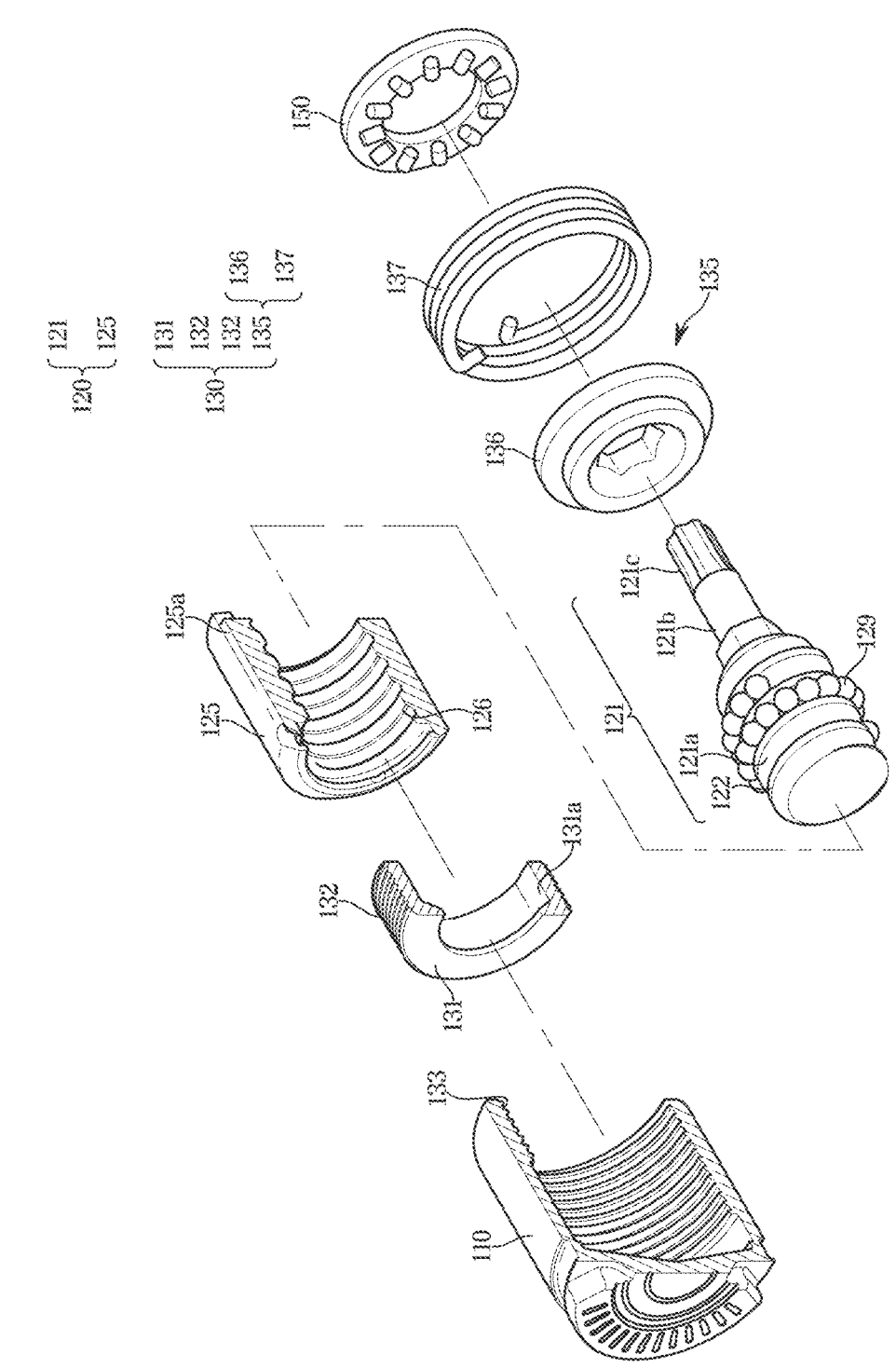

【FIG. 4】
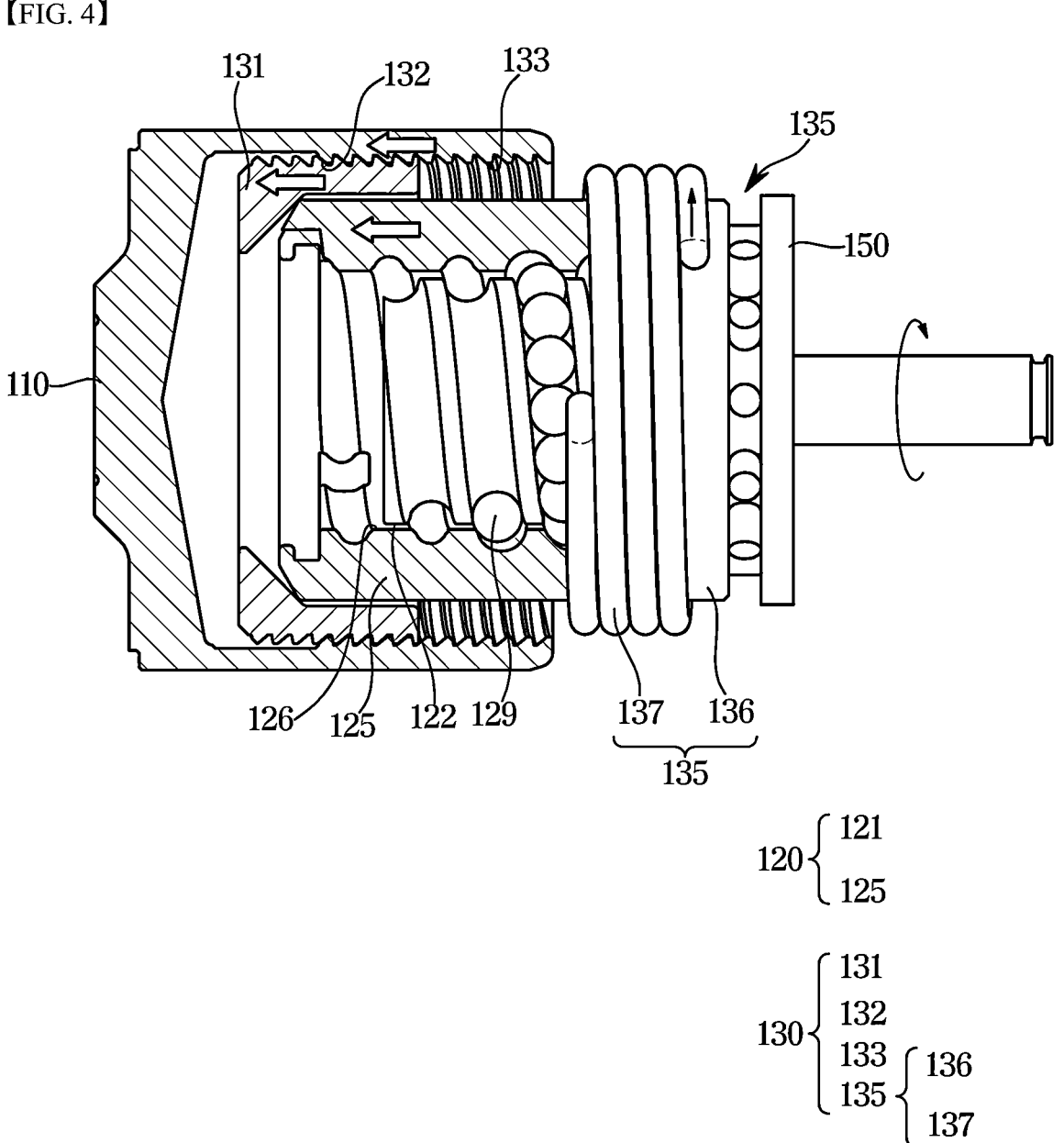

【FIG. 5】
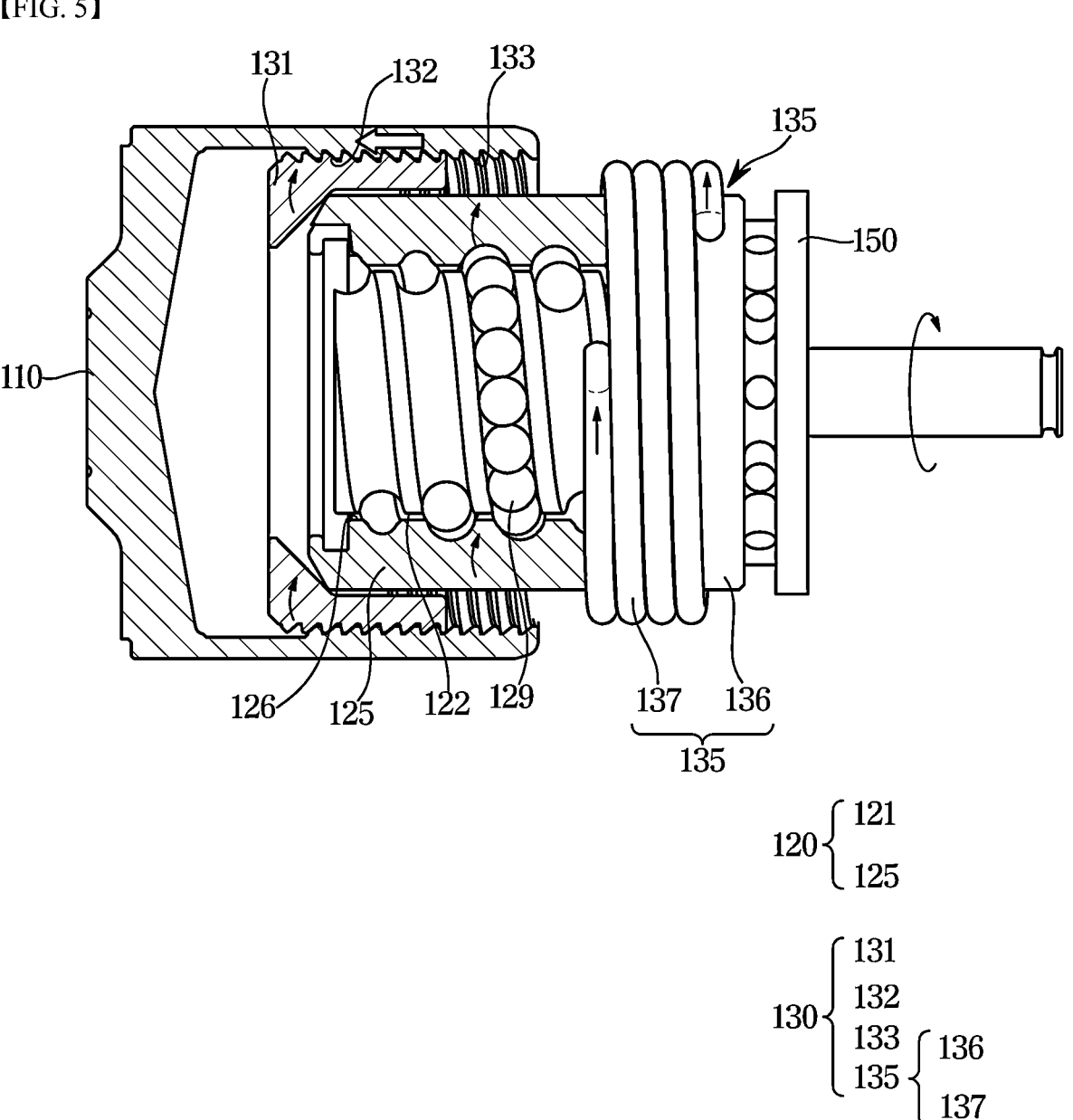

【FIG. 6】
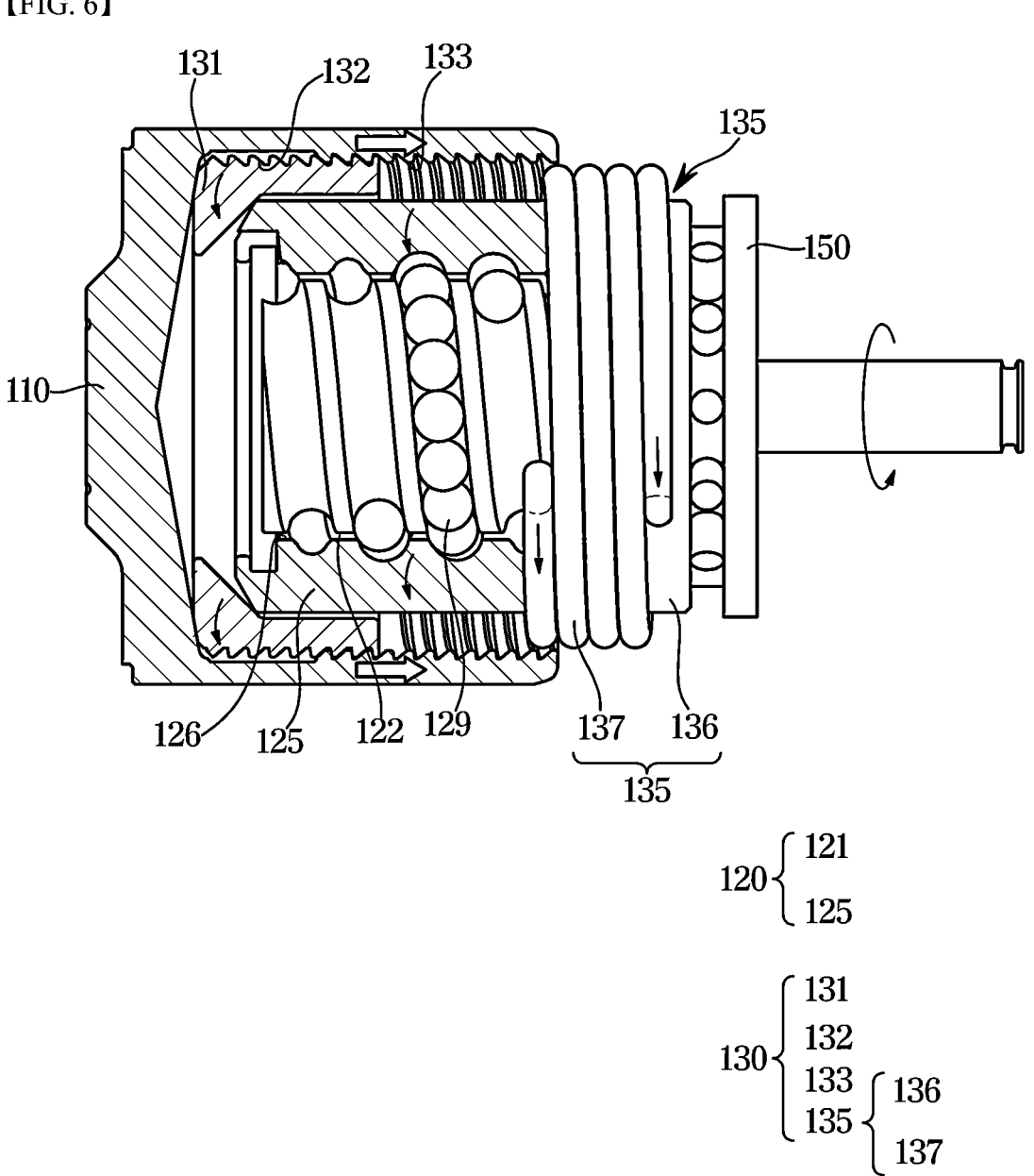

【FIG. 7】
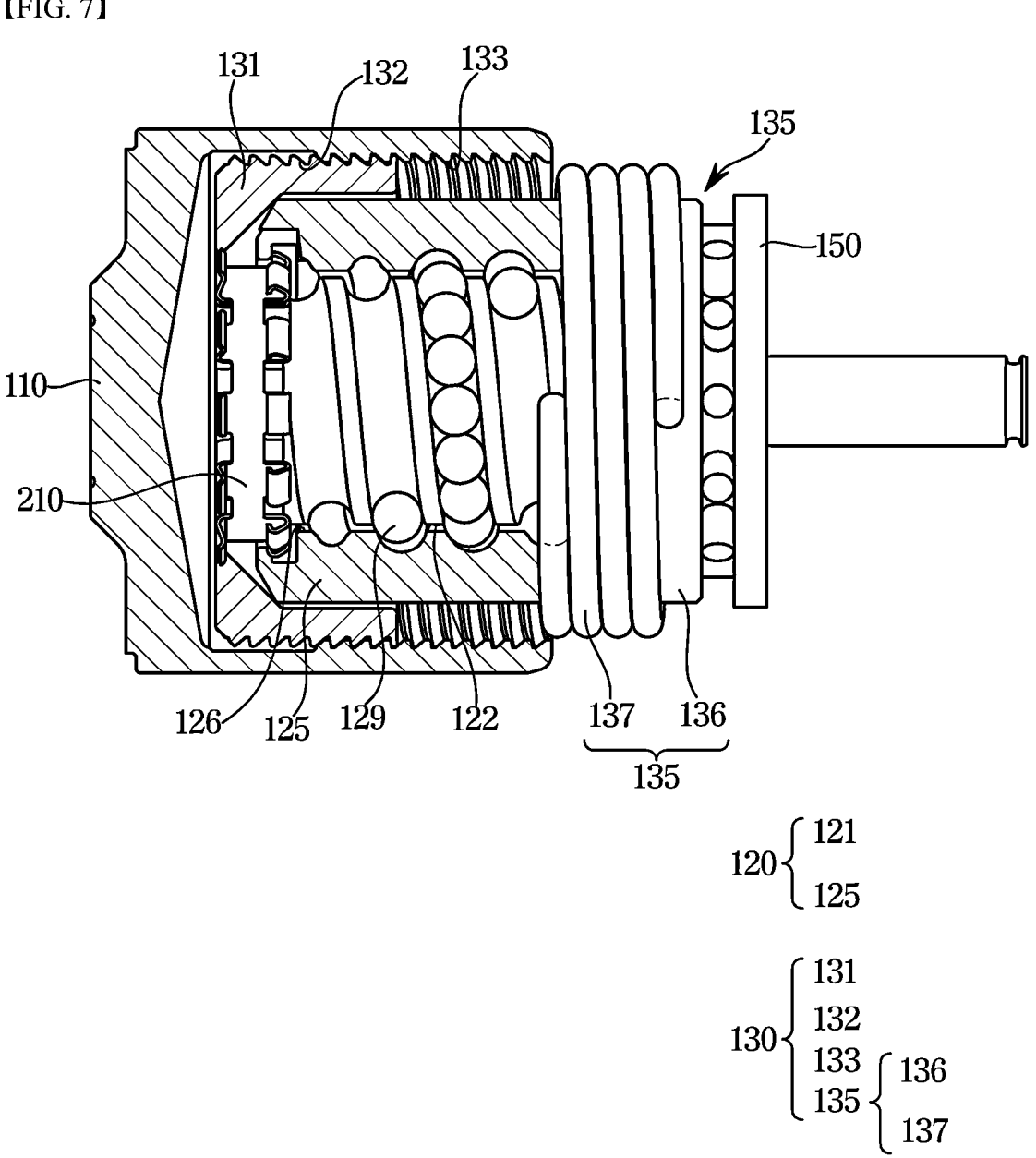

1

ELECTROMECHANICAL BRAKE AND METHOD OF OPERATING THE SAME

CROSS-REFERENCE TO RELATED APPLICATIONS

This application is the U.S. National Stage of International Patent Application No. PCT/KR2021/007099 filed on Jun. 7, 2021, which claims priority to Korean Patent Application No. 10-2020-0068764 filed in the Korean Intellectual Property Office on Jun. 8, 2020, the disclosure of which is incorporated by reference herein in its entirety.

TECHNICAL FIELD

The present disclosure relates to an electromechanical brake and a method of operating the same, and more particularly, to an electromechanical disc brake for realizing braking of a vehicle using a rotational driving force of a motor and a method of operating the same.

BACKGROUND ART

Generally, a vehicle is essentially equipped with a brake system for performing braking, and various types of brake systems have been proposed for a safety of a driver and passenger.

Conventional brake systems mainly use a method of supplying hydraulic pressure required for braking to a wheel cylinder using a mechanically connected booster when a driver depresses a brake pedal. However, nowadays, as a next-generation brake system, development of an electromechanical brake system that receives a driver's intention to brake as an electric signal and operates an electric device such as a motor based on the electric signal to provide braking power to a vehicle has been ongoing.

Such electromechanical brake systems convert rotational force of a motor into linear motion through a motor and a speed reducer to provide a clamping pressure to a brake disc, thereby performing a service brake and a parking brake of the vehicle.

On the other hand, brake pads that directly contact and press a brake disc of a vehicle are gradually abraded according to the repeated braking operation of a vehicle. To maintain braking performance of a vehicle despite wear of brake pads, implement of compensating for the wear of brake pads is required. However, in this case, applicability of a vehicle decreases due to an increase in a size or axial length of a brake system.

DISCLOSURE

Technical Problem

An aspect of the disclosure is to provide an electromechanical brake system capable of maintaining and improving braking performance of a vehicle despite wear of brake pads, and a method of operating the same.

Another aspect of the disclosure is to provide an electromechanical brake system capable of stably braking a vehicle in various operating conditions of the vehicle, and a method of operating the same.

Another aspect of the disclosure is to provide an electromechanical brake system capable of reducing size and weight to improve applicability of a vehicle and to promote space utilization of a vehicle, and a method of operating the same.

Another aspect of the disclosure is to provide an electromechanical brake system capable of easily compensating for wear of brake pads with a simple structure, and a method of operating the same.

Another aspect of the disclosure is to provide an electromechanical brake system capable of improving braking performance by reducing a drag phenomenon and suppressing braking noise and vibration, and a method of operating the same.

Technical Solution

In accordance with an aspect of the present disclosure, an electromechanical brake includes a piston configured to advance and retreat to press a brake pad; a power transmission unit configured to receive a driving force from an actuator to convert a rotational motion into a linear motion, and provide the converted driving force to the piston; and a position adjustment unit configured to adjust a relative position of the piston with respect to the power transmission unit; wherein the power transmission unit includes a spindle rotating by receiving the driving force from the actuator, and a nut connected to the spindle and moving forward or backward an inside of the piston by rotation of the spindle in a first direction or a second direction to advance and retreat the piston, wherein the position adjustment unit includes an adjusting screw provided on an outer side of the nut and rotating together with the nut, a first screw thread formed on an outer circumferential surface of the adjusting screw, a second screw thread formed on an inner circumferential surface of the piston and meshing with the first screw thread, and an adjuster provided between the spindle and the nut, the adjuster configured to rotate the nut and the adjusting screw in the first direction or the second direction by compressing or expanding to its original shape when an rotation amount of the spindle exceeds a predetermined rotation amount, to advance or retreat the relative position of the piston.

The adjuster may include a flange extending radially on an outer circumferential surface of the spindle, a torsion spring having one end supported on the nut and the other end supported on the flange.

The torsion spring may be configured to be compressed by the rotation amount of the spindle in the first direction from a braking release state of the vehicle to a braking state of the vehicle, and an elastic restoring force by the rotation amount in the first direction of the torsion spring may be provided to be smaller than an screw fastening force between the adjusting screw and the piston.

An internal thread may be formed on an inner circumferential surface of the nut, the spindle may include a first end on one side of which an external thread meshing with the internal thread is formed on an outer circumferential surface thereof, a second end on the other side connected to the actuator, and a central portion disposed between the first end and the second end, and the flange may be fixedly installed on an outer peripheral surface of the central portion.

The position adjustment unit may further include a binding cap configured to bind the adjusting screw and the nut.

The electromechanical brake may further include an electronic control unit configured to control operation of the actuator, and a detection unit configured to detect an engaging force between the brake pad and the disk rotating together with a wheel.

In accordance with another aspect of the present disclosure, a method of operating the electromechanical brake includes, in response to that the engaging force between the disc and the brake pad detected by the detection unit in a braking state of the vehicle is less than a predetermined value, determining, by the electronic control unit, that wear of the brake pad presents, and entering, by the electronic control unit, a first mode for advancing the relative position of the piston.

The method may further include, in response to that the engaging force between the disc and the brake pad detected by the detection unit in a braking release state of the vehicle is greater than a predetermined value, determining, by the electronic control unit, that the a drag presents, and entering, by the electronic control unit, a second mode for retreating the relative position of the piston.

The method may further include, in the first mode, by the electronic control unit, controlling the operation of the actuator to rotate the spindle in a first direction from a braking release state of the vehicle to a braking state of the vehicle to compress the torsion spring, and generating an additional first direction rotation of the spindle exceeding the predetermined rotation amount, and inducing the first direction rotation of the nut and the adjusting screw by the elastic restoring force of the torsion spring, thereby advancing the relative position of the piston with respect to the nut by the first direction rotation of the adjusting screw.

The method may further include, in the second mode, by the electronic control unit, controlling the operation of the actuator to rotate the spindle in a second direction from a braking state of the vehicle to a braking release state of the vehicle to expand the torsion spring, and generating an additional second direction rotation of the spindle exceeding the predetermined rotation amount, and inducing the second direction rotation of the nut and the adjusting screw by the elastic restoring force of the torsion spring, thereby retreating the relative position of the piston with respect to the nut by the second direction rotation of the adjusting screw.

Advantageous Effects

An embodiment of disclosure may provide an electromechanical brake system capable of maintaining and improving braking performance of a vehicle despite wear of brake pads, and a method of operating the same.

Further, an embodiment of disclosure may provide an electromechanical brake system capable of stably braking a vehicle in various operating conditions of the vehicle, and a method of operating the same.

Further, an embodiment of disclosure may provide an electromechanical brake system capable of reducing size and weight to improve applicability of a vehicle and to promote space utilization of a vehicle, and a method of operating the same.

Further, an embodiment of disclosure may provide an electromechanical brake system capable of easily compensating for wear of brake pads with a simple structure, and a method of operating the same.

Further, an embodiment of disclosure may provide an electromechanical brake system capable of improving braking performance by reducing a drag phenomenon and suppressing braking noise and vibration, and a method of operating the same.

DESCRIPTION OF DRAWINGS

FIG. 1 is a lateral cross-sectional view illustrating an electromechanical brake according to an embodiment of the disclosure.

FIG. 2 is a lateral cross-sectional view illustrating an enlarged main part of an electromechanical brake according to an embodiment of the disclosure.

FIG. 3 is an exploded perspective view illustrating the main part of the electromechanical brake according to the embodiment of the disclosure.

FIG. 4 is a lateral cross-sectional view illustrating an operation of the electromechanical brake according to an embodiment of the disclosure in a braking state of a vehicle.

FIG. 5 is a lateral cross-sectional view illustrating an operation of the electromechanical brake according to an embodiment of the disclosure in a first mode state for compensating for wear of brake pads.

FIG. 6 is a lateral cross-sectional view illustrating an operation of the electromechanical brake according to an embodiment of the disclosure in a second mode for reducing drag.

FIG. 7 is a lateral cross-sectional view illustrating an enlarged main part of an electromechanical brake according to a modified embodiment of the disclosure.

MODES OF THE INVENTION

Hereinafter, the embodiments of the disclosure will be described in detail with reference to accompanying drawings. It should be understood that the terms used in the specification and the appended claims should not be construed as limited to general and dictionary meanings, but interpreted based on the meanings and concepts corresponding to technical aspects of the disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

FIG. 1 is a lateral cross-sectional view illustrating an electromechanical brake 100 according to an embodiment of the disclosure.

Referring to FIG. 1, an electromechanical brake 100 according to an embodiment of the disclosure may include a carrier (not shown) on which a pair of pad plates 11 and 12 are installed to press a disk (not shown) rotating together with a wheel of a vehicle, a caliper housing 20 that is slidably installed on the carrier to operate the pair of pad plates 11 and 12, a piston 110 that is installed to move forward and backward inside the caliper housing 20, an actuator (not shown) that generates and provides a driving force for moving the piston 110, a power transmission unit 120 that realizes forward and backward movement of the piston 110 in an axial direction by converting rotational driving force provided from the actuator into linear motion to transmit to the piston 110, a position adjustment unit 130 that compensates for wear of brake pads 10 or reducing drag phenomenon by adjusting a relative position of the piston 110 with respect to the power transmission unit 120, a detection unit 140 that detects adhesion force between the disk 10 and the brake pads 10 or engaging force of the brake pads 10, and an electronic control unit (not shown, ECU) that controls an operation of the actuator based on information provided from the detection unit 140.

The pair of pad plates 11 and 12 is provided with the brake pad 10 attached to an inner surface thereof, respectively. The pair of pad plates 11 and 12 have the inner pad plate 11 disposed so that an outer surface thereof is in contact with a front surface (a left surface based on FIG. 1) of the piston 110, and the outer pad plate 12 disposed so that an outer surface thereof is in contact with a finger part 22 of the caliper housing 20. The pair of pad plates 11 and 12 is slidably installed on the carrier.

The caliper housing 20 includes the finger part 22 for operating the outer pad plate 12 and a cylinder part 21 in which the piston 110 is installed, and is slidably fastened to the carrier. When the vehicle is a braking operation, the caliper housing 20 slides from the carrier by a reaction force caused by the movement of the piston 110 and approaches the disk, and in turn the outer pad plate 12 by the finger part 22 approaches the disk side, thereby pressing the disk.

FIGS. 2 and 3 are lateral cross-sectional and exploded perspective views illustrating enlarged main part of the electromechanical brake 100 according to an embodiment of the embodiment. Referring to FIGS. 1 to 3, the piston 110 may be provided in a cup shape in which a rear side thereof (a right side based on FIGS. 1 and 2) is opened, and is slidably inserted inside the cylinder part 21. Furthermore, the piston 110 may receive power through the actuator and the power transmission unit 120 to be described later and press the inner pad plate 11 against the disk side. A second screw thread 133 that meshes with a first screw thread 132 formed on an outer circumferential surface of an adjusting screw 131 to be described later may be formed on an inner circumferential surface of the piston 110. An operation of adjusting a relative position of the piston 110 with respect to a spindle 121 or a nut 125 by the position adjustment unit 130 will be described later with reference to FIGS. 4 to 6.

The power transmission unit 120 may include the spindle 121 that rotates by receiving a driving force from the actuator, the nut 125 that is disposed inside the piston 110 and is screw-coupled to the spindle 121 to move forward together with the piston 110 by a first direction rotation of the spindle 121 or to move backward together with the piston 110 by a second direction rotation of the spindle 121, and a plurality of balls 129 interposed between the spindle 121 and the nut 125. The power transmission unit 120 may be provided as a ball-screw type transmission device that converts a rotational motion of the spindle 121 into a linear motion.

Here, the first direction rotation of the spindle 121 refers to a rotation direction in which the nut 125 is advanced by the rotation of the spindle 121, and the second direction rotation of the spindle 121 refers to a rotation direction in which the nut 125 is retracted by the rotation of the spindle 121 as rotation in a direction opposite to the first direction.

The spindle 121 includes a first end 121a on one side of which an external thread 122 is formed on an outer circumferential surface thereof, a second end 121c on the other side connected to the actuator to receive the driving force, and a central portion 121c disposed between the first end 121a and the second end 121c to which a flange 136 to be described later is fixed. The first end 121a of the spindle 121 may be inserted into the nut 125, and a bearing 150 that promotes smooth rotation of the flange 136 to be described later and the detection unit 140 for sensing a load applied to the spindle 121 and measuring an engaging force between the disc and the brake pads 10 may be disposed on the second end 121c.

The nut 125 may be formed in a hollow cylindrical shape so that the first end 121a of the spindle 121 is inserted therein, and an internal thread 126 that meshes with the external thread 122 of the spindle 121 through balls (not shown) may be formed on an inner circumferential surface of the nut. Furthermore, the adjusting screw 131 to be described later may be provided on an outer side of the nut 125 to surround at least a portion of an outer circumferential surface of the nut 125. The outer circumferential surface of the nut 125 may be provided with an anti-rotation surface 125a at least a portion of which is formed in a flat surface to prevent relative rotation with the adjusting screw 131. Because the ball-screw type power transmission device is a well-known technology that is already widely applied, a detailed description of operation thereof will be omitted.

The actuator (not shown) may include a motor and a reducer having a plurality of reduction gears, and may receive power from a power supply disposed in the vehicle to generate and provide a driving force. The actuator may transmit the driving force generated by being connected to the second end 121c of the spindle 121 to a rotational motion of the spindle 121. The actuator may be installed on the outside of the caliper housing 20, and the reducer may be provided to the spindle 121 by decelerating power of the motor by applying devices with various structures such as a planetary gear assembly or a worm structure.

The position adjustment unit 130, by adjusting the relative position of the piston 110 with respect to the power transmission unit 120, may advance the relative position of the piston 110 so as to compensate for wear of the brake pads 10, or retreat the relative position of the piston 110 in order to reduce drag phenomenon.

The position adjustment unit 130 may include the adjusting screw 131 provided on the outer side of the nut 125 and rotating together with the nut 125, the first screw thread 132 formed on an outer circumferential surface of the adjusting screw 131, the second screw thread 133 that is formed on the inner circumferential surface of the piston 110 and meshes with the first screw thread 132, and an adjuster 135 provided between the spindle 121 and the nut 125. The adjuster 135, by compressing or expanding according to an rotation amount of the spindle 121, rotates the nut 125 and the adjusting screw 131 in the first direction to advance the relative position of the piston 110 or rotates the nut 125 and the adjusting screw 131 in the second direction opposite to the first direction to reverse the relative position of the piston 110.

Here, the first direction rotation of the nut 125 or the adjusting screw 131 described below is the same rotational direction as the first direction rotation of the spindle 121 described above, and refers to a rotational direction in which the piston 110 is advanced by the rotation of the adjusting screw 131. Furthermore, the second direction rotation of the nut 125 or the adjusting screw 131, which is a rotation in the opposite direction to the first direction, is the same rotational direction as the second direction rotation of the spindle 121 described above, and refers to a rotational direction in which the piston 110 is reversed by the rotation of the adjusting screw 131.

The adjusting screw 131 is provided so as to surround a front side of the nut 125, and is provided with the first screw thread 132 formed on an outer circumferential surface thereof. The adjusting screw 131 may rotate together with the nut 125, and at the same time, may be formed an anti-rotation surface 131a in which at least a portion of the inner circumferential surface in contact with the nut 125 is formed as a flat surface so as to prevent relative rotation. When the nut 125 is rotated by the adjuster 135 to be described later, the adjusting screw 131 may transmit the rotational force of the nut 125 to the piston 110 while rotating together with the nut 125. Because the adjusting screw 131 is provided interposed between the nut 125 and the piston 110, the adjusting screw 131 may absorb a load generated when the nut 125 and the piston 110 contact, thereby preventing deformation and wear of components such as the nut 125 and the piston 110 with large loads.

The first screw thread 132 may be formed on the outer circumferential surface of the adjusting screw 131, the second screw thread 133 may be formed on the inner circumferential surface of the piston 110, and the first and second screw threads 132 and 133 are provided by meshing with each other. As such, because the adjusting screw 131 and the piston 110 that rotate and linearly move together with the nut 125 are screw-coupled to each other, the nut 125, the adjusting screw 131, and the piston 110, which are linearly moved together, may move forward together during braking of a general vehicle, or may move backward together during braking release of a vehicle. At the same time, because the piston 110 and the adjusting screw 131 may rotate relative to each other, the piston 110 according to the rotation of the nut 125 and the adjusting screw 131 in the first direction may move forward relatively with respect to the nut 125 or the spindle 121, and the piston 110 according to the rotation of the nut 125 and the adjusting screw 131 in the second direction, which is opposite to the first direction, may move backward relatively with respect to the nut 125 or the spindle 121.

The adjuster 135 may cause the rotation of the nut 125 and the adjusting screw 131 to advance or retreat the relative position of the piston 110 with respect to the nut 125 or the spindle 121. The adjuster 135 may include a flange 136 that is fixed to the central portion 121c of the spindle 121 and is formed to expand in a radial direction thereof, and a torsion spring 137 provided between the nut 125 and the flange 136 to elastically support the nut 125 with respect to the flange 136. The torsion spring 137 induces the first or second direction rotations of the nut 125 and the adjusting screw by compressing or expanding to its original shape when the spindle 121 or the flange 136 exceeds a predetermined rotation amount.

The flange 136 is radially extended to the central portion 121b of the spindle 121, and is fixed to the spindle 121 to rotate integrally with the spindle 121. A bearing 150 that promotes smooth rotation of the flange 136 and prevents abrasion between the flange 136 and surrounding components may be provided on the rear surface (the right side based on FIG. 2).

The first and third protrusions 137 and 139 are formed to protrude from the front surface (the left side based on FIG. 2) of the flange 136 opposite to the nut 125, and may rotate about the spindle 121 as an axis together with the flange 136 when the spindle 121 rotates. The second protrusion 138 is formed to protrude from the rear surface (the right side based on FIG. 2) of the nut 125 opposite to the flange 136, and may be caught by the first protrusion 137 or the third protrusion 139 to induce the rotation of the nut 125 and the adjusting screw 131.

The torsion spring 137 may have one end inserted and fixed on the outer circumferential surface of the nut 125, and the other end inserted and fixed to the flange 136. The torsion spring 137 maintains a compressed or expanded state within the predetermined rotation amount, for example, within a rotation amount of the spindle 121 between a braking release state of the vehicle and a braking state of the vehicle. However, in response to exceeding the predetermined rotation amount, the torsion spring 137 may induce the first or second direction rotations of the nut 125 and the adjusting screw 131 by being compressed or expanded so as to restore its original circular shape.

More specifically, when switching from a before braking state or a braking release state of the vehicle to the braking state of the vehicle, an elastic restoring force by the rotation amount in the first direction of the spindle 121 may be provided smaller than an screw fastening force between the adjusting screw 131 and the piston 110. Accordingly, during braking of a general vehicle, even when the spindle 121 and the flange 136 rotate in the first direction, the torsion spring 137 maintains the compressed state thereof, so that and the relative position of the piston 110 with respect to the nut 125 or the spindle 121 may be constantly maintained.

However, as will be described later, when the rotation amount of the spindle 121 for braking the vehicle exceeds the rotation amount in the first direction so as to compensate for wear of the brake pad 10, the elastic restoring force of the torsion spring 137 is greater than the screw fastening force between the adjusting screw 131 and the piston 110. Accordingly, the torsion spring 137 expands to be restored to its original shape, so that the nut 125 and the adjusting screw 131 rotate in the first direction by expansion of the torsion spring 137. As a result, the relative position of the piston 110 with respect to the nut 125 or the spindle 121 may advance. Furthermore, as will be described later, during the second mode being performed to reduce drag, when the rotation amount of the spindle 121 for releasing braking of the vehicle exceeds the rotation amount in the second direction, the elastic restoring force of the torsion spring 137 becomes greater than the screw fastening force between the adjusting screw 131 and the piston 110. Accordingly, the torsion spring 137 is compressed to be restored to its original shape, and the second direction rotation of the nut 125 and the adjusting screw 131 occurs by the compression of the torsion spring 137. As a result, the relative position of the piston 110 with respect to the nut 125 or the spindle 121 may be retreated. A detailed description thereof will be described later with reference to FIGS. 4 to 6.

After the nut 125 and the piston 110 advance for the braking operation of the vehicle to cause the disc and the brake pad 10 come into close contact with each other, when the actuator malfunctions or the power supply is cut off, braking of the vehicle is required to self-release in order to promote a safety of the passengers. For example, during the braking operation of the vehicle, the torsion spring 137 is compressed by the first direction rotation of the spindle 121 and the flange 136, but when the operation of the actuator is stopped or the power supply is cut off, the spindle 121 may rotate in the second direction by the elastic restoring force of the torsion spring 137, so that the nut 125 and the spindle 121 are retreated to release braking of the vehicle.

The detection unit 140 is provided to detect adhesion force or engaging force between the disc and the brake pads 10. The detection unit 140 may be provided as a force sensor that detects the load of the spindle 121 or the actuator to measure the engaging force between the disc and the brake pads 10, but is not limited thereto. The detection unit 140 may transmit information on the detected engaging force of the brake pad 10 to the ECU, and the ECU may determine wear or drag of the brake pads 10 based on the information on the engaging force detected by the detection unit 140.

Hereinafter, an operation method of the electromechanical brake 100 system according to an embodiment of the disclosure will be described.

FIG. 4 is a lateral cross-sectional view illustrating the operation of the electromechanical brake 100 according to an embodiment of the disclosure in the braking state of the vehicle.

Referring to FIGS. 2 and 4, during general braking that does not enter a first mode or a second mode to be described later, such as a service brake or parking brake of the vehicle, the electromechanical brake system may operate from the braking release state as shown in FIG. 2 to the braking state as shown in FIG. 4.

More specifically, when a driver applies an effort force to a brake pedal (not shown) to brake the vehicle, a pedal displacement sensor (not shown) detects a driver's intention to brake as an electrical signal and transmits the detected electric signal to the ECU. The ECU, based on the electrical signal, may control the operation of the actuator so that the disc and the brake pad 10 come into close contact to each other, thereby implementing braking of the vehicle.

When the vehicle is braked, the spindle 121 rotates in the first direction by the predetermined rotation amount by the operation of the actuator, and in turn the nut 125 advances according to the first direction rotation of the spindle 121, so that the piston 110 also advances toward the pad plate. As the brake pad 10 mounted on the pad plate approaches and closely adheres to the disc, the engaging force is generated, thereby causing the vehicle to be braked.

At this time, the spindle 121 rotates in the first direction so that the torsion spring 137 is compressed, but the elastic restoring force of the torsion spring 137 generated by the rotation amount in the first direction predetermined from the braking release state of the vehicle to the braking state of the vehicle is smaller than the screw fastening force between the adjusting screw 131 and the piston 110. As a result, during a general braking situation, the rotation of the nut 125 and the adjusting screw 131 does not occur. Accordingly, the relative position of the piston 110 with respect to the nut 125 or the spindle 121 may be constantly maintained.

When braking of the vehicle is released, the electromechanical brake system may operate from the braking state as shown in FIG. 4 to the braking release state as shown in FIG. 2. More specifically, the spindle 121 rotates in the second direction by the operation of the actuator, and in turn the nut 125 retreats according to the second direction rotation of the spindle 121, so that the piston 110 is also spaced apart from and retreated from the pad plates 11 and 12. As each of the brake pads 10 mounted on the pad plates 11 and 12 is spaced apart from the disk, thereby releasing braking of the vehicle. At this time, the rotation amount in the second direction of the spindle 121 corresponds to the rotation amount in the first direction of the spindle 121 in a general braking situation, and accordingly, the torsion spring 137 also returns to its original shape according to the second direction rotation of the spindle 121.

Hereinafter, the first mode in which the electromechanical brake 100 according to an embodiment of the disclosure compensates for wear of the brake pad 10 will be described so that braking performance of the vehicle may be maintained despite wear of the brake pad 10.

In response to that the adhesion force or engaging force between the disc and the brake pad 10 measured by the sensor 140 in the braking state of the vehicle is less than a predetermined normal range value, the ECU determines that wear of the brake pad 10 presents and may enter the first mode for compensating it.

FIG. 5 is a lateral cross-sectional view illustrating an operation of the electromechanical brake 100 according to an embodiment of the disclosure in the first mode state for compensating for wear of the brake pad 10.

Referring to FIG. 5, the ECU rotates the spindle 121 in the first direction by controlling the operation of the actuator so as to enter the first mode. At this time, the ECU generates an additional first direction rotation that exceeds the rotation amount in the first direction of the spindle 121 predetermined for the braking a general vehicle. By the additional first direction rotation of the spindle 121, the torsion spring 137 is compressed more than the braking state of a general vehicle, and at this time, the elastic restoring force of the torsion spring 137 is formed to be greater than the screw fastening force between the adjusting screw 131 and the piston 110. While the torsion spring 137 expands to be restored to its original shape, the first direction rotation of the nut 125 and the adjusting screw 131 is generated, and in turn the relative position of the piston 110 with respect to the nut 125 or the spindle 121 advances, thereby compensating for wear of the brake pad 10.

After completion of the first mode for compensating for wear of the brake pad 10, the electromechanical brake 100 according to an embodiment of the disclosure rotates the spindle 121 in the second direction by the rotation amount corresponding to the rotation amount in the second direction of the spindle 121 in a general braking release situation, thereby returning to the braking release state or the before braking of the vehicle. In other words, during the first mode, the additional first direction rotation of the spindle 121 is generated compared to a general braking situation, but after completing the first mode, the electromechanical brake returns the spindle 121 to the adjusted position by rotating only the rotation amount in the second direction of the spindle 121 during a general braking or a general braking release. Accordingly, when the vehicle is braked again after the first mode, braking is performed in a state in which the relative position of the piston 110 with respect to the spindle 121 or the nut 125 compensates for wear of the brake pad 10, thereby performing stably braking of the vehicle.

Hereinafter, an operation in which the electromechanical brake 100 according to an embodiment of the disclosure performs the second mode so as to reduce a drag phenomenon in which the piston 110 does not quickly return to its original position after the braking operation of the vehicle will be described.

In response to that the adhesion force or engaging force between the disc and the brake pad 10 measured by the sensor 140 in the braking release state of the vehicle is greater than a predetermined normal range value, the ECU determines that the drag phenomenon presents in which the piston 110 does not return to its original position, and may enter the second mode.

FIG. 6 is a lateral cross-sectional view illustrating an operation of the electromechanical brake 100 according to an embodiment of the disclosure in the second mode state for reducing drag.

Referring to FIG. 6, the ECU rotates the spindle 121 in the second direction by controlling the operation of the actuator so as to enter the second mode. At this time, the ECU generates an additional second direction rotation exceeding the rotation amount in the second direction of the spindle 121 predetermined from the braking state to the braking release state of a general vehicle. By the additional second direction rotation of the spindle 121, the torsion spring 137 is expanded more than the braking release state of a general vehicle, and at this time, the elastic restoring force of the torsion spring 137 is formed to be greater than the screw fastening force between the adjusting screw 131 and the piston 110. As the torsion spring 137 is compressed to be restored its original shape, the nut 125 and the adjusting screw 131 rotate in the second direction, and thus, the relative position of the piston 110 with respect to the nut 125 or the spindle 121 is retreated. As a result, the piston 110 is spaced apart from the pad plate, thereby reducing drag.

Hereinafter, an electromechanical brake according to a modified embodiment of the disclosure will be described.

The description of the electric mechanical brake according to the modified embodiment of the disclosure to be described below is the same as the electric mechanical brake 100 according to the embodiment of the disclosure described above, except for cases where additional reference numerals are used to describe the electromechanical brake according to the modified embodiment of the disclosure, and thus the description thereof will be omitted to prevent duplication of contents.

FIG. 7 is an enlarged lateral cross-sectional view illustrating a main part of the electromechanical brake 100 according to the modified embodiment of the disclosure. Referring to FIG. 7, a binding cap 210 for binding the adjusting screw 131 and the nut 125 to each other may be provided.

The binding cap 210 is provided to cover the opened front side of the nut 125, and has an inner circumferential side thereof is fixed and supported by the nut 125 and an outer circumferential side thereof is fixed and supported on an inner circumferential side of the adjusting screw 131, so that binding the nut 125 and the adjusting screw 131 to each other. The rotational and linear motions of the nut 125 and the adjusting screw 131 may be synchronized by the binding cap 210, and further, the adjusting screw 131 and the piston 110 are screw-coupled together to move integrally. Accordingly, when braking of the vehicle is released, as the nut 125 returns to its original position, the adjusting screw 131 and the piston 110 also smoothly return to their original position, so that subsequent braking operation of the vehicle may be quickly prepared.

The invention claimed is:

1. An electromechanical brake, comprising:
a piston configured to advance and retreat to press a brake pad;
a power transmission unit configured to receive a driving force from an actuator to convert a rotational motion into a linear motion, and provide the converted driving force to the piston; and
a position adjustment unit configured to adjust a relative position of the piston with respect to the power transmission unit;
wherein the power transmission unit comprises:
a spindle rotating by receiving the driving force from the actuator, and
a nut connected to the spindle and moving forward or backward an inside of the piston by rotation of the spindle in a first direction or a second direction to advance and retreat the piston,
wherein the position adjustment unit comprises:
an adjusting screw configured to surround at least a portion of an outer circumferential surface of the nut to prevent relative rotation with respect to the nut such that the adjusting screw rotates together with the nut,
a first screw thread formed on an outer circumferential surface of the adjusting screw,
a second screw thread formed on an inner circumferential surface of the piston and meshing with the first screw thread, and
an adjuster provided between the spindle and the nut, the adjuster configured to:
rotate the nut and the adjusting screw in the first direction or the second direction by compressing or expanding to its original shape by an elastic restoring force when a rotation amount of the spindle exceeds a predetermined rotation amount, to advance or retreat the relative position of the piston.

2. The electromechanical brake of claim 1, wherein the adjuster includes:
a flange extending radially on an outer circumferential surface of the spindle,
a torsion spring having one end supported on the nut and the other end supported on the flange.

3. The electromechanical brake of claim 2, wherein
the torsion spring is configured to be compressed by the rotation amount of the spindle in the first direction from a braking release state of the vehicle to a braking state of the vehicle, and
the elastic restoring force by the rotation amount in the first direction of the torsion spring is provided to be smaller than a screw fastening force between the adjusting screw and the piston.

4. The electromechanical brake of claim 2, wherein
an internal thread is formed on an inner circumferential surface of the nut,
the spindle include a first end on one side of which an external thread meshing with the internal thread is formed on an outer circumferential surface thereof, a second end on the other side connected to the actuator, and a central portion disposed between the first end and the second end, and
the flange is fixedly installed on an outer peripheral surface of the central portion.

5. The electromechanical brake of claim 2, wherein the position adjustment unit further comprises a binding cap configured to bind the adjusting screw and the nut.

6. The electromechanical brake of claim 2, further comprising
an electronic control unit configured to control operation of the actuator; and
a detection unit configured to detect an engaging force between the brake pad and the disk rotating together with a wheel.

7. A method of operating the electromechanical brake according to claim 6, the method comprising:
in response to that the engaging force between the disc and the brake pad detected by the detection unit in a braking state of the vehicle is less than a predetermined value,
determining, by the electronic control unit, that wear of the brake pad presents, and
entering, by the electronic control unit, a first mode for advancing the relative position of the piston.

8. The method of claim 7, further comprising:
in response to that the engaging force between the disc and the brake pad detected by the detection unit in a braking release state of the vehicle is greater than a predetermined value,
determining, by the electronic control unit, that a drag presents, and
entering, by the electronic control unit, a second mode for retreating the relative position of the piston.

9. The method of claim 7, further comprising:
in the first mode, by the electronic control unit,
controlling the operation of the actuator to rotate the spindle in a first direction from a braking release state of the vehicle to a braking state of the vehicle to compress the torsion spring, and generating an additional first direction rotation of the spindle exceeding the predetermined rotation amount, and
inducing the first direction rotation of the nut and the adjusting screw by the elastic restoring force of the torsion spring, thereby advancing the relative position of the piston with respect to the nut by the first direction rotation of the adjusting screw.

10. The method of claim 8, further comprising:

in the second mode, by the electronic control unit, controlling the operation of the actuator to rotate the spindle in a second direction from a braking state of the vehicle to a braking release state of the vehicle to expand the torsion spring, and generating an additional second direction rotation of the spindle exceeding the predetermined rotation amount, and inducing the second direction rotation of the nut and the adjusting screw by the elastic restoring force of the torsion spring, thereby retreating the relative position of the piston with respect to the nut by the second direction rotation of the adjusting screw.

\* \* \* \* \*